United States Patent [19]

Braun

[11] Patent Number: 4,592,012

[45] Date of Patent: * May 27, 1986

[54] METHOD OF INTERFACING PERIPHERAL DEVICES WITH A CENTRAL PROCESSOR

[75] Inventor: Leon Braun, Hollywood, Fla.

[73] Assignee: Sebrn Corporation, Miami, Fla.

[*] Notice: The portion of the term of this patent subsequent to Jan. 29, 2002 has been disclaimed.

[21] Appl. No.: 679,587

[22] Filed: Dec. 7, 1984

Related U.S. Application Data

[62] Division of Ser. No. 416,177, Sep. 2, 1982, Pat. No. 4,497,041.

[51] Int. Cl.⁴ .................. G06F 3/00; G06F 5/00; G06F 7/00
[52] U.S. Cl. ................................................ 364/900
[58] Field of Search ... 364/200 MS File, 900 MS File; 340/365 S; 370/80

[56] References Cited

U.S. PATENT DOCUMENTS

| | | | |
|---|---|---|---|
| 3,631,403 | 12/1971 | Asbo et al. | 364/200 |
| 3,648,252 | 3/1972 | Thron et al. | 364/200 |
| 3,699,532 | 10/1972 | Schaffer et al. | 364/200 |
| 3,921,148 | 11/1975 | Ophir et al. | 364/900 |
| 3,996,564 | 12/1976 | Kerrigan et al. | 364/200 |
| 4,058,680 | 11/1977 | Curtiss | 179/7.1 R |
| 4,082,922 | 4/1978 | Chu | 370/80 |
| 4,502,120 | 2/1985 | Ohnishi et al. | 364/900 |

Primary Examiner—Harvey E. Springborn
Attorney, Agent, or Firm—Jack E. Dominik

[57] ABSTRACT

A method of interfacing peripheral digital information gathering devices with a computer includes the positioning of an interface module with each peripheral device and obtaining information therefrom in series of N-bit words. Thereafter each such series of words is stored in the interface modules. Thereafter, words in the interface modules to be disregarded are electronically masked, and the output of non-masked words are stored in a memory. The memory is provided with a not-empty indicator adapted to block further input from the peripheral when the memory has words in storage. Thereupon, communication of the non-disregarded memory words occurs to the computer. The method also includes the usage of parallel-to-serial converters within each interface module to thus enable parallel data generated by the peripheral to be received in memory as serial data.

12 Claims, 5 Drawing Figures

RIGHT HALF

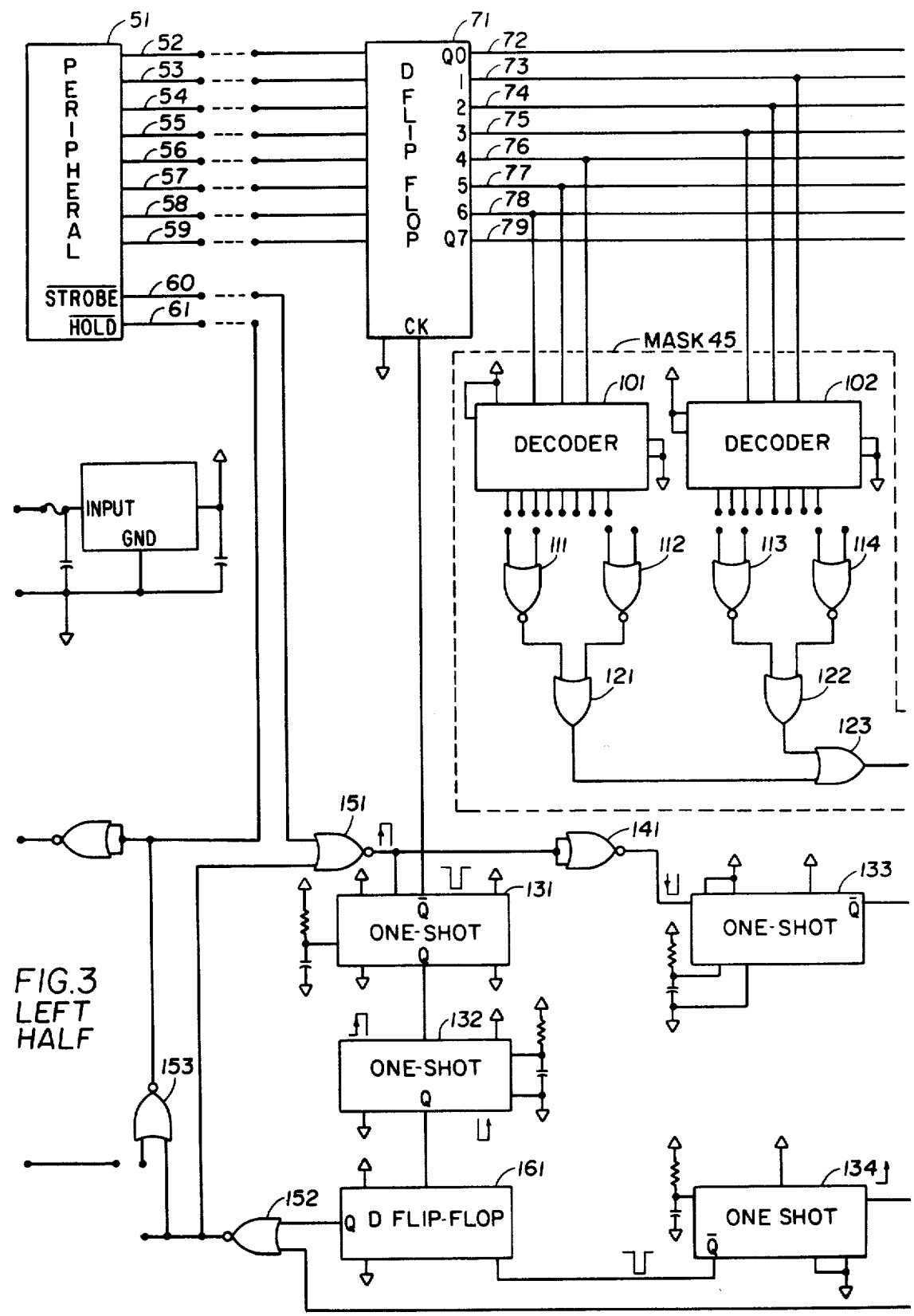

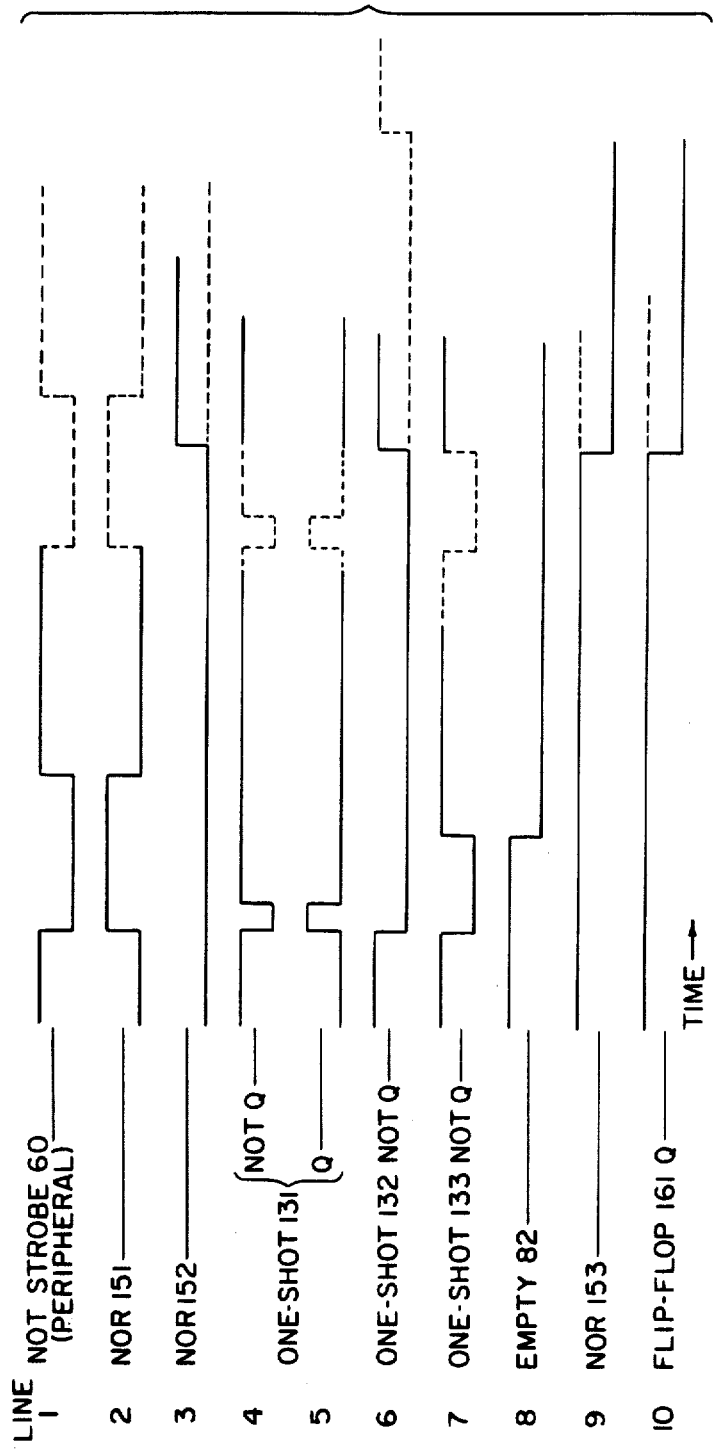
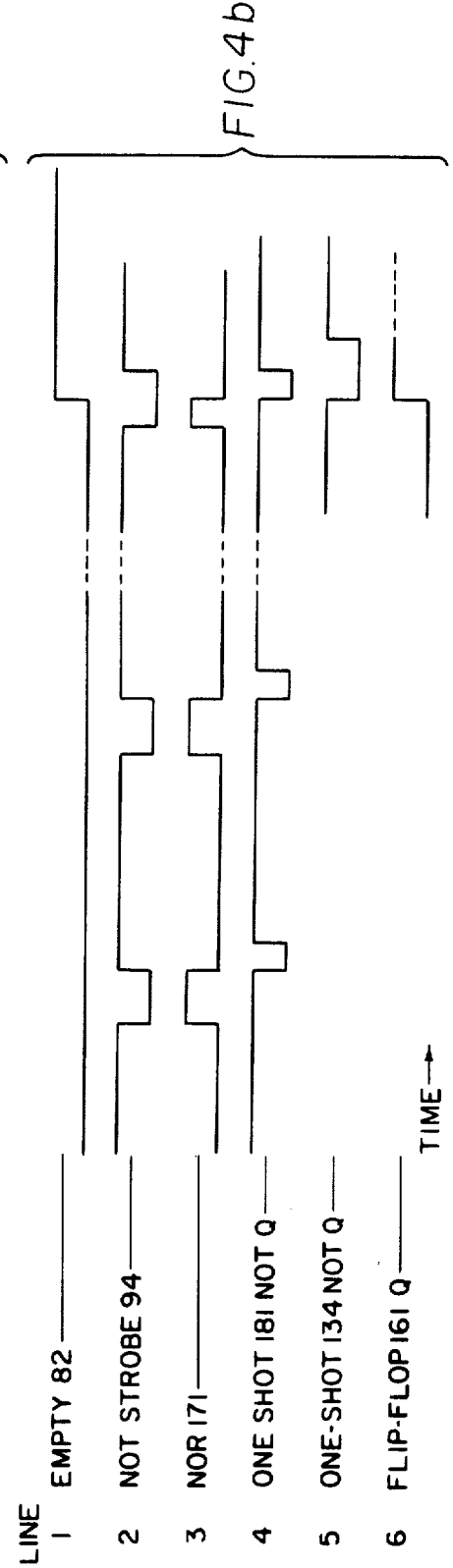

METHOD OF INTERFACING PERIPHERAL DEVICES WITH A CENTRAL PROCESSOR

REFERENCE TO RELATED APPLICATION

This case is a divisional application of Ser. No. 416,177 filed Sept. 9, 1982, entitled PARALLEL SERIAL CONTROLLER, now U.S. Pat. No. 4,497,041 dated Jan. 29, 1985. This application incorporates by reference all matters set forth in explanatory fashion in that patent without repeating the same.

BACKGROUND OF THE INVENTION

1. Field of the Invention

This invention relates to a method of interfacing a plurality of peripheral digital information gathering devices with a central digital computer.

2. Description of the Prior Art

The most relevant prior art known to the inventor consists of U.S. Pat. No. 3,631,403 to Asbo; U.S. Pat. No. 3,699,532 to Schaffer; U.S. Pat. No. 3,921,148 to Ophir; U.S. Pat. No. 4,058,680 to Curtis; and U.S. Pat. No. 4,082,922 to Chu.

The invention is believed to be properly classified in the following areas: U.S. Class 179, Subclass 7.1R; U.S. Class 364, Subclasses 200 and 900; and U.S. Class 370, Subclass 80.

Interfacing computers with peripherals such as cash registers presents many problems due to the range of speed, variety of signal types and levels, and complexity of signal structure. Indeed, the variety among different types of cash registers is enormous, and the only commercial computer controlled cash registers are those which incorporate a microprocessor directly into each cash register in addition to a central computer. The drawbacks of such a system are the excessive cost of all of the hardware and firmware required. Thus there is a problem in the prior art to provide an interfacing between a central computer and a variety of cash registers, plus possibly other peripherals, which is effective, simple and inexpensive, and operates on inexpensive transmission line.

SUMMARY OF THE INVENTION

The invention constitutes a method of interfacing a plurality of peripheral digital information gathering devices, such as cash registers, with a central digital processing means. The interfacing method comprises the steps of positioning one interface module with each peripheral device and obtaining information therefrom as a series of N-bit words; storing such series of N-bit words in the interface modules; masking those words in the interface modules to be disregarded; providing means for receiving the non-disregarded memory output of said modules; providing means for transferring said memory output; providing said memory receiving means with a not-empty indicator in combination with said memory transfer means to thereby block further inputs from said peripheral divices when said memory receiving means has words in storage; and communicating each series of non-disregarded memory words from said memory to said central processing means.

BRIEF DESCRIPTION OF THE DRAWINGS

FIGS. 4a and 4b are timing diagrams illustrating how the preferred embodiment of the inventive interface processes data.

DETAILED DESCRIPTION OF PREFERRED EMBODIMENTS

Figure 1:
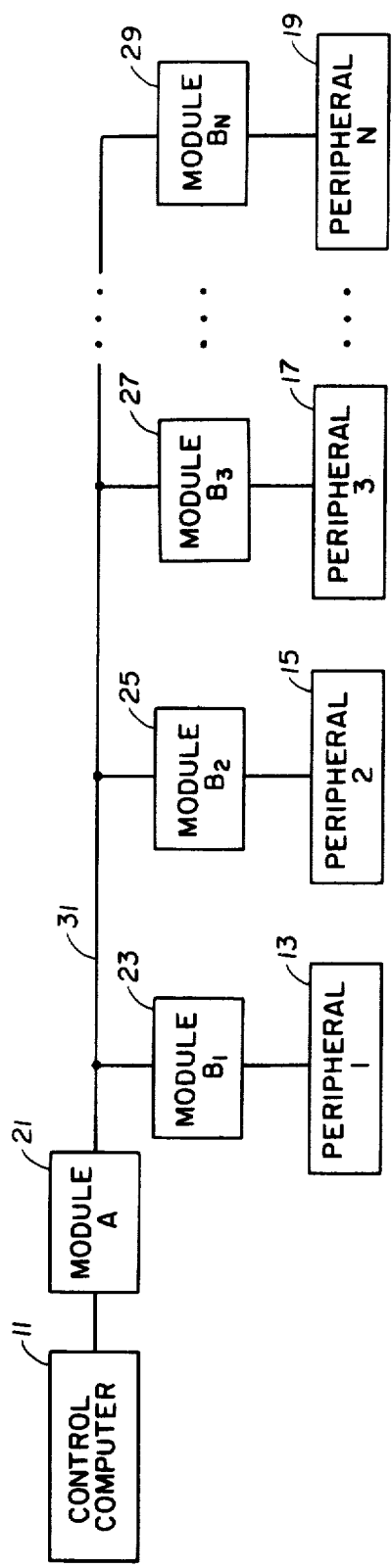
FIG. 1 illustrates how a central computer controls N peripherals by interfacing with N inventive interfaces.

FIG. 1 illustrates control computer 11 (preferably an Altos 8000 computer, available in early 1982, in San Jose, Calif.) and peripherals 13, 15, 17 and 19 which interface with computer 11 by modules 21, 23, 25, 27 and 29 as follows. Module 21 is attached to the RS-232 port of computer 11 and converts RS-232 signals into RS-422 balanced line signals. The RS-422 signals are sent and received on bi-directional balanced line 31 to and from modules 23, 25, 27 and 29. Line 31 may be up to a mile long if the equivalent of Belden No. 8795 is used; the use of such transmission line is much cheaper than coaxial cable or 16 or 32-bit bus line. Further, line 31 may also include a second bi-directional balanced line (i.e., a total of four wires) for handshaking between computer 11 and modules 23, 25, 27 and 29. As described below, each of modules 23, 25, 27 and 29 has its own address and will only respond to signals on line 31 when its address is included. Modules 23, 25, 27 and 29 interface the RS-422 signals on line 31 with peripherals 13, 15, 17 and 19, respectively. A detailed description of module 23 (which is same as modules 25, 27 and 29) follows.

Figure 2:
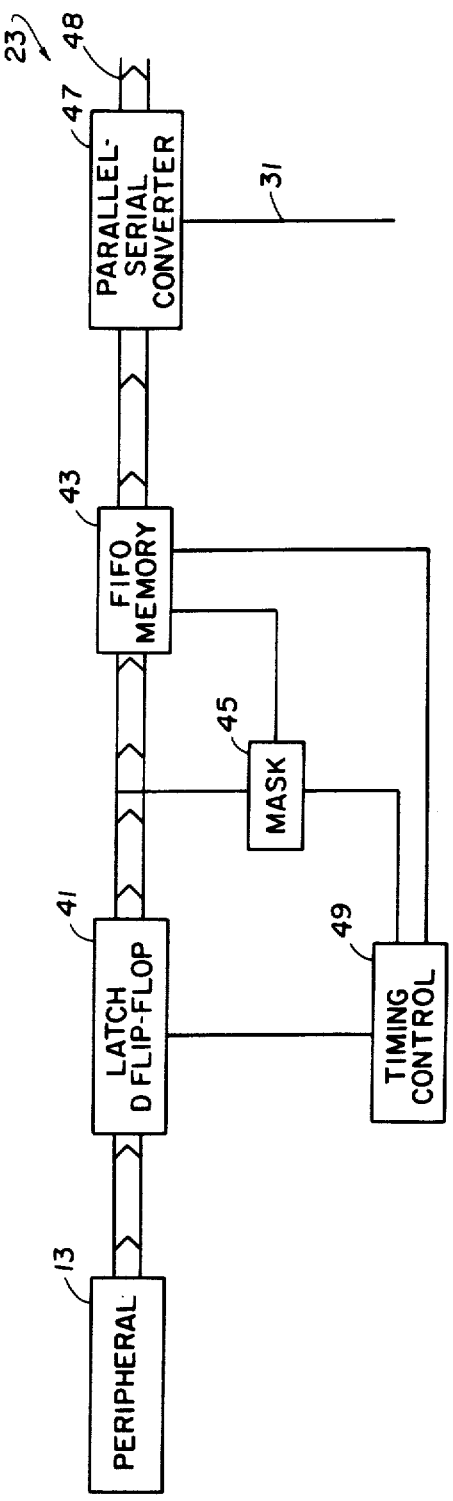
FIG. 2 is a block diagram of a preferred embodiment of the inventive interface.

FIG. 2 is a block diagram of module 23 illustrating the interfacing between the peripheral 13 and line 31. Parallel data is transferred between peripheral 13 and latch 41. The data is then transferred from latch 41 to FIFO memory 43 provided that mask 45, which compares the data to preselected undesirable states, permits the transfer. Upon signal from computer 11 the data is transferred from memory 43 to parallel-serial converter 47 for serial transmission on line 31 to converter module 21 and computer 11. The timing and control of the transfers of data are accomplished by timing control 49. Further, computer 11 may, optionally, output data, such as information to the operator of peripheral 13, as illustrated by output bus 48.

Figure 3:
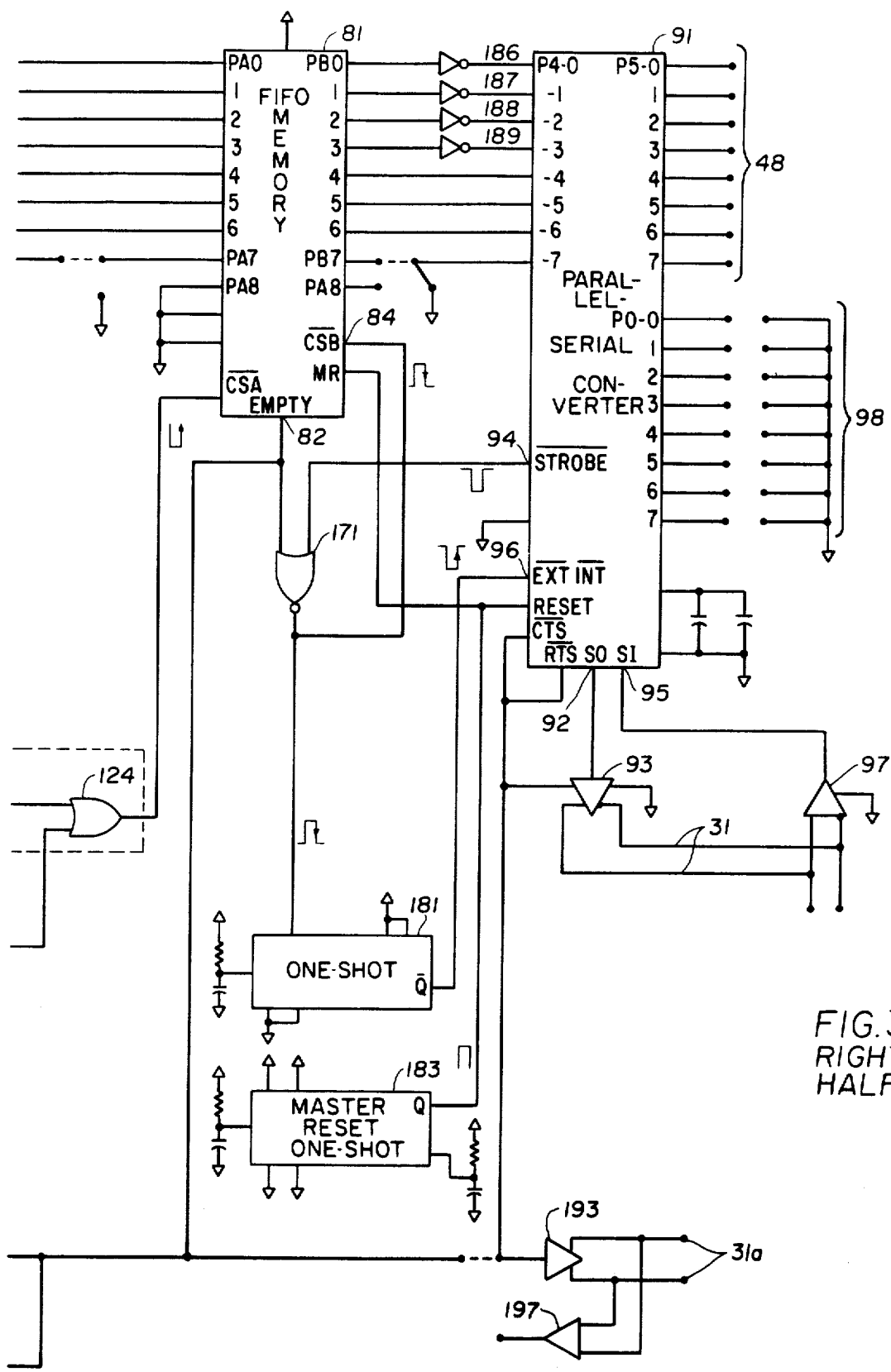
FIG. 3 is a schematic diagram of a preferred embodiment of the inventive interface.

FIG. 3 illustrates a schematic diagram of a preferred embodiment connected to receive eight-bit parallel output from peripheral 51; the output appears on lines 52 through 59. Peripheral 51 also has a data indicating strobe output which appears on line 60 and a hold input from line 61. Output lines 52-59 are connected to the eight D inputs of octal D flip-flop 71. The Q output lines 72-79 correspond to the D input lines 52-59, respectively. Flip-flop 71 acts as a latch for the output of peripheral 51, as will be explained below. Output lines 72-79 are connected to the PA0-PA7 inputs of FIFO memory 81, respectively. Outputs PB0-PB7 of memory 81 are connected to inputs P4-0 through P4-7 of parallel-serial converter 91, except that outputs PB0-PB3 are shown as inverted prior to input into converter 91. This inversion is optional, as discussed below, and is used to compensate for inversion by peripheral 51. Thus parallel data from peripheral 51 is latched by flip-flop 71, then stored in memory 81 on a first-in/first-out basis, and then transferred to converter 91 for conversion to serial form and transmission to computer 11. The serial output from converter 91 appears at pin 92 and is interfaced with balanced bi-directional line 31 by tri-state interface 93.

Communication from computer 11 arrives on balanced bi-directional line 31 and is interfaced with serial input pin 95 of converter 91 by tri-state interface 97. The individual address of converter 91 is shown as 8-bit direct strapped by tying appropriate pins P00–P07 (labelled 98 in FIG. 3). With 8 bits 256 addresses are available, although it may be convenient to have one address common for all converters on line 31 and thus computer 11 would be able to communicate with 255 distinct converters one at a time or all together.

A hardware mask to eliminate unwanted output from peripheral 51 is accomplished by the combination of 3-bit decoders 101 and 102, NOR-gates 111, 112, 113 and 114 and OR-gates 121, 122, 123 and 124, as will be described below. This hardware masking could, of course, also be performed by software, but harware is faster and software may not be fast enough if peripheral 51 outputs a high percentage of spurious data. For example, Kingtron cash register SP series outputs a high percentage of spurious data. A hardware mask is commercially feasible for this preferred embodiment because the preferred embodiment has low cost and thus may be dedicated to the particular peripheral 51 and its characteristics.

Control of the output of data from peripheral 51 through flip-flop 71 into memory 81 is by means of the combination of one-shots 131, 132, 133, and 134, inverter 141, NOR-gates 151, 152 and 153, and D flip-flop 161, as will be explained below.

The transfer of data from memory 81 to converter 91 is controlled by the combination of the central control computer, NOR-gate 171 and one-shot 181, as will be explained below.

FIG. 4a is a timing diagram which shows how data from peripheral 51 is transferred onto communication line 31 under the initial conditions that the preferred embodiment has been reset by activation of master reset one-shot 183. Thus memory 81 is empty and the one-shots and flip-flops have been reset and flip-flop 161 preset by one-shot 134.

Peripheral 51 outputs data on lines 52–59 and, while the data is held on these lines, also provides a Not Strobe pulse on line 60 to indicate the presence of the new data; this is shown to the left in the first line of timing diagram FIG. 4a. This Not Strobe pulses passes through NOR-gate 151 because the other iput to NOR-gate 151 is the output of NOR-gate 152 which is low due to the preset of flip-flop 161 and also to the empty state of memory 81. The left portions of the second and third lines of FIG. 4a illustrate the situation. The rising edge of the pulse output of NOR-gate 151 triggers one-shot 131 to provide a relatively short Not Q pulse to the clock input of flip-flop 71 and a Q pulse to the rising edge triggered input of one-shot 132; these pulses are shown on the left portions of the fourth and fifth lines of FIG. 4a, respectively. The pulse width of the Not Q and Q pulses is adjustable and determined by the resistance and capacitance connected to the timing pin of one-shot 131; in FIG. 4a this pulse width is shown to be about one quarter of the peripheral's Not Strobe pulse width and provides a delay from the leading edge of the Not Strobe pulse to insure that the accompanying data in lines 52–59 is fully set up for loading into flip-flop 71; this loading occurs on the rising edge (trailing edge) of the Not Q output of one-shot 131.

The rising edge of the Q output of one-shot 131 triggers one-shot 132 which outputs a Not Q pulse with a pulse width somewhat larger than the time between successive Not Strobe pulses on line 60 relating to the same data outputted by peripheral 51. Lines one and six of FIG. 4a illustrate this with a second Not Strobe pulse shown in dotted lines, and the significance of the Not Q pulse width will be explained below. The pulse width of the Not Q output of one-shot 132 is adjustable and determined by the resistance and capacitance connected to the timing pins of one-shot 132.

The NOR-gate 151 output pulse, in addition to triggering one-shot 131 as previously described, is inverted by inverter 141 and the falling edge triggers one-shot 133. The Not Q output pulse of one-shot 133 has a pulse width some what greater than that of the Not Q output of one-shot 131 plus the delay of mask 45 so that the data from peripheral 51 is loaded onto lines 72–79 (and thus appears at inputs PA0–PA7 of memory 81) and is decoded by mask 45 prior to the rising edge (trailing edge) of the Not Q output pulse of one-shot 133 which triggers memory 81 to load the data available at inputs PA0–PA7 into its first in-first out memory. Lines four and seven of FIG. 4a illustrate this. Of course, the Not Q output pulse of one-shot 133 must pass through OR-gate 124 before it can trigger loading of memory 81; OR-gate 124 is the point at which mask 45 (formed by the combination of decodes 101 and 102, NOR-gates 111, 112, 113 and 114, and OR-gates 121, 122 and 123) operates, as will be explained below.

Once the data is loaded into memory 81, the Empty output (pin 82) of memory 81 goes from high to low, as shown in line eight of FIG. 4a, and this transistion provides a low input to NOR-gate 152 but does not trigger one-shot 134. Because flip-flop 161 has not yet been triggered at the clock input by the rising edge (trailing edge) of the Not Q pulse from one-shot 132 its Q output remains high, having been preset by the initial master reset as previously noted. Consequently, the output of NOR-gate 152 remains low when the Empty output of memory 81 goes low. This is illustrated in the left portions of the third, sixth and tenth lines of FIG. 4a.

Peripheral 51 will normally output data more complex than a single eight-bit word, and will output a series of words in accordance with a series of Not Strobe pulses. Such a second Not Srobe pulse is indicated in dotted lines in the first line of FIG. 4a and will have the same effect as the first Not Strobe pulse with the exception that Empty output of memory 81 will be low. But most importantly, one-shot 132 will be retriggered prior to the completion of the Not Q pulse outputted in response to the first Not Strobe pulse from peripheral 51. This permits the data appearing on lines 52–59 associated with the second Not Strobe pulse to be stored in memory 81 in the same manner as the data associated with the first Not Strobe pulse. The dotted pulses shown in FIG. 4a illustrate this. However, once the series of Not Strobe pulses associated with one batch of data from peripheral 51 terminates, memory 81 is cut off from accepting any further data and peripheral 51 is put on hold by the following mechanism.

If the Not Strobe pulse to the left in the first line of FIG. 4a were the last in a series, then the dotted line second Not Strobe pulse would not appear and consequently the Not Q pulse output from one-shot 132 would terminate as shown by the solid lines on line six of FIG. 4a. This termination of the Not Q pulse from one-shot 132 triggers the clock of flip-flop 161 and loads the landed D input and drives the Q output low as shown in solid lines on line ten of FIG. 4a. Because the Empty Output of memory 81 had previously been driven low, both inputs to NOR-gate 152 are now low and its output high. The high output of NOR-gate 152 causes NOR-gate 151 to block any further Not Strobe pulses from peripheral 51 and also drives NOR-gate 153 low which is inputted to the Not Hold input of peripheral 151. Thus peripheral 151 is disabled from transmitting further data. The circuit elements described in FIG. 4a will remain in the states illustrated in solid lines at the right portion of the Figure until memory 81 is unloaded and transmitted to computer 11, as now will be described.

FIG. 4b is a timing diagram illustrating how computer 11 calls on converter 91 and extracts data stored in memory 81. Initially there is data in memory 81 and the Empty output pin 82 is low. The Not Strobe output at pin 94 of converter 91 is high until computer 11 calls converter 91 and requests data, such request generates a series Not Strobe pulse as shown to the left in line one of FIG. 4b. This series of pulses automatically continues until the data is all extracted from memory 81, converted to serial format and transmitted to computer 11. Such automatic internal pulse generation is a feature of the particular converter 91 used in the preferred embodiment, but could easily be duplicated by hardware or software if other converters are used. The Not Strobe pulse is inverted by NOR-gate 171 and inputted to the Not CSB pin 84 of memory 81; the rising edge of the NOR-gate 171 output pulse triggers memory 81 to discard the data then on output pins PB0–PB7 and the falling edge to take the oldest data out of memory and have it appear on output pins PB0–PB7.

The falling edge of NOR-gate 171 output triggers one-shot 181 and thereby provides a Not Q pulse to the Not Ext Int pin 96 of converter 91 and thereby causes converter 91 to convert the data at pins P4-0 through P4-7 to serial form and output it at serial out pin 92 to tri-state interface 93 and then on to bi-directional line 31. The pulse width of the Not Q pulse of one-shot 181 is necessarily made large enough to permit memory 81 sufficient time to set up the oldest data in memory on output pins PB0–PB7 and inverters 186 through 189 to invert it. Inverters 186 through 189 optional and part of the customization of the preferred embodiment to peripheral 51. For example 6, the output of Kingtron SP series cash registers requires inverters 186 through 189, but many other cash registers' output does not. The pulse width is adjustable and determined by the resistance and capacitance tied to the timing pin of one-shot 181.

After triggering of the Not Ext Int input of converter 91 has caused conversion and transmission of the first eight-bit word from memory 81, the converter 91 provides another Not Strobe pulse to extract the next eight-bit word from memory 81 in the same manner. During this time peripheral 51 remains on hold.

The right portion of FIG. 4b illustrates the pulses upon the last eight-bit word being extracted from memory 81, converted by converter 91 and sent to computer 11. The emptying of memory 81 causes Empty output to go from low to high and this truncates the NOR-gate 171 output in response to the last Not Strobe pulse, but otherwise the conversion and transmission of the last eight-bit word is the same as the previous eight-bit words.

After the last eight-bit word has been transmitted, the Empty output of memory 81 being high will block at NOR-gate 171 any further Not Strobe pulses generated by converter 91.

The emptying of memory 81 and consequent transition of Empty output of memory 81 from low to high also triggers one-shot 134 which produces a Not Q pulse which presets flip-flop 161 and drives the Q output of flip-flop 161 high as shown on lines five and six of FIG. 4b. Thus immediately after the transition of Empty of memory 81 from low to high both inputs to NOR-gate 152 are high and thus the output low which means that the output of NOR-gate 153 is high, the Not Hold input 61 to peripheral 51 is high (thereby reactivating peripheral 51), and NOR-gate 151 is no longer prevented from responding to Not Strobe pulses from peripheral 51. Thus the preferred embodiment is returned to the state for acceptance of further data from peripheral 51 and leading it into memory 81 as illustrated in FIG. 4a.

The operation of the mask formed by decoders 101 and 102, NOR-gates 111, 112, 113 and 114, and OR-gates 121, 122, 123 and 124 is straightforward. Of course, the connections of the decoders 101 and 102 to the data lines 72–79, the number of such decoders, and the connections of the NOR-gates to the decoders is adjustable and determined by the particular peripheral 51 and its output characteristics. Thus considering the connections shown in FIG. 3 as merely exemplary, and presuming that peripheral 51 outputs a non-data eight-bit word which is not to be transmitted to computer 11 and which includes the following bits: 1 on line 53, 0 on line 54, 1 on line 55, 0 on line 56, 1 on line 57, and 0 on line 58, the mask operates as follows. The mask would be prepared to block such a non-data word by connecting one of the inputs of NOR-gate 111 to the "2" output of decoder 101 and the other input of NOR-gate 111 to the "5" output of decoder 102. Thus when the non-data word appears at the output of peripheral 151 and is strobed into the outputs 72–79 of flip-flop 71, the bits on lines 73, 74 and 75 are 1, 0 and 1, respectively, which is decoded by decoder 102 into a low at the "5" output and high at the remainder of the outputs (because 101 is the binary expression for 5). Similarly the bits on lines 76, 77 and 78 are 0,1, and 0, respectively, which is decoded by decoder 101 as a low output "2" and high output on the remainder of the outputs (because 010 is the binary expression for 2). Thus the two inputs to NOR-gate 111 are low precisely when the bits on lines 73–78 are 101010, respectively, and thus the output of NOR-gate 111 is high. This high output passes through OR-gates 121, 123 and 124, and thereby drives the Not CSA input of memory 81 high prior to the trailing edge of the Not Q output pulse from one-shot 133 (which was triggered in response to the Not Strobe that is associated with the non-data word). Memory 81 is not activated unless the Not CSA input pulse has a width greater than some minimum, which minimum exceeds the propagation delay through the mask. Note that the pulse width of the Not Q pulse is set to be larger than this minimum. Consequently, the non-data word is not stored in memory 81, although the remainder of the effects of the Not Strobe pulse associated with the non-word data remain the same; in particular, one-shot 132 is triggered and thus the long pulse which keeps flip-flop 161 from being clocked and cutting off peripheral 51 is still generated.

Clearly connecting NOR-gates 112, 113 and 114 to decoders 101 and 102 can provide for three other six-bit non-data combinations to be masked out. Similarly, adding further decoders to encompass lines 52 and 59 of peripheral 51 is immediate. The advantage of this hardware masking is that it may be easily tailored to the particular peripheral because the connecting of the inputs of the NOR-gates to the outputs of the decoders is straightforward. This also avoids software complications in the central computer.

If the central computer calls converter 91 during a transfer of data from peripheral 51 into memory 81, then memory 81 may be emptied frequently during a single train of Not Strobe pulses and eight-bit words from peripheral 51. However, this does not adversely affect the operation of the preferred embodiment because the only overlap between the portion of the preferred embodiment for storing in memory 81 and the portion for withdrawing from memory 81 is neutralized by the Q output of flip-flop 161 remaining high throughout the storing of data.

The preferred components for the preferred embodiment shown in FIG. 3 are as follows (the 74 and 75 prefix numbers appear in the 1982 standard Texas Instrument component catalog; the WD prefix number appears in the 1980 Western Digital, Irvine, Calif., component catalog; and the SCU prefix number appears in the 1982 Mostek, Carrollton, Tex. catalog):

TABLE

| Drawing No. | Component | Type |
| --- | --- | --- |
| 71 | octal D flip-flop | 74LS374 |
| 81 | FIFO Memory | WD1510 |
| 91 | Parallel-Serial Converter | SCU20 |
| 93 | Tri-state interface | 75172 |
| 97 | Tri-state interface | 75173 |
| 101 | 3-bit decoder | 74LS138 |
| 102 | 3-bit decoder | 74LS138 |
| 111 | NOR-gate | 74LS02 |
| 112 | NOR-gate | 74LS02 |
| 113 | NOR-gate | 74LS02 |
| 114 | NOR-gate | 74LS02 |
| 121 | OR-gate | 74LS32 |
| 122 | OR-gate | 74LS32 |
| 123 | OR-gate | 74LS32 |
| 124 | OR-gate | 74LS32 |
| 131 | One-shot | 74LS123 |
| 132 | One-shot | 74LS123 |
| 133 | One-shot | 74LS123 |
| 134 | One-shot | 74LS123 |
| 141 | Inverter | 74LS02 (tied inputs) |
| 151 | NOR-gate | 74LS02 |
| 152 | NOR-gate | 74LS02 |
| 153 | NOR-gate | 74LS02 |
| 161 | D flip-flop | 74LS74 |
| 172 | NOR-gate | 74LS02 |
| 181 | One-shot | 74LS123 |
| 183 | One-shot | 74LS123 |
| 186 | Inverter | 74LS04 |
| 187 | Inverter | 74LS04 |
| 188 | Inverter | 74LS04 |
| 189 | Inverter | 74LS04 |
| 193 | Tri-state interface | 75172 |
| 197 | Tri-state interface | 75173 |

And the preferred pulse widths from the one-shots are as follows under the presumption that peripheral 51 provides a train of Not Strobe pulses with a range of 20–500 microseconds between successive leading edges:

| One-shot | Pulse width (microseconds) |
| --- | --- |
| 131 | 1–2 |
| 132 | 300–20,000 |
| 134 | 15–30 |

One-shot 181 preferably has an output pulse width of 2 microseconds and one-shot 133 a pulse width of 10 microseconds for use with a WD1510 for memory 81 and SCU20 for converter 91.

One-shot 183 provides a 100,000 microsecond wide pulse for master resetting of the preferred embodiment.

The preferred embodiment permits data from peripheral 51 to be stored pending call by and transmission to the central computer, thus one central computer may control many peripherals. Yet the high rate of transmission of data from memory 81 to the central computer results in only negligible hold time for peripheral 51, and in practice a cash register operator would hardly notice it.

Further other features illustrated in the preferred embodiment include handshaking by use of a second bi-directional balanced line 31a and tri-state interfaces 193 and 197. Also, computer 11 may transmit data or instruction to peripheral 51 or affiliated equipment using the same line 31 and output at pins P50–P57 (labelled 48) of converter 91. For example, a price display on a cash register as peripheral 51 could be controlled by computer 11.

It is to be thereby appreciated that the above set forth electronic system for effectuating an interface between peripheral outputs and the computer may, as well, be expressed as a novel electrical method in which various other and different logic arrangements, apart from those above described, may be suitable for the implementation of such method.

Therefore, while there has been shown and described the preferred embodiment of the present invention, it will be understood that the invention may be embodied otherwise than is herein specifically illustrated and described, and that within said embodiment certain changes in the detail of construction, and the form and arrangement of the parts may be made without departing from the underlying idea of principles of this invention within the scope of the appended claims.

I claim:

1. A method of interfacing a plurality of peripheral digital information gathering devices, such as cash registers, with a central digital processing means, the method comprising the steps of:

(a) connecting an interface module having a memory with each such peripheral device and obtaining information therefrom in the form of a digital series of N-bit words:

(b) storing each said series of N-bit words respectively in said interface module memory:

(c) masking those words in said interface module memories which are to be disregarded;

(d) providing memory receiving means for receiving the non-disregarded memory output of said module memories:

(e) providing means for transferring said memory outputs;

(f) providing said memory receiving means with a not-empty indicator, in combination with said memory output transfer means, to thereby block further input from said peripheral devices when said memory receiving means has words in storage; and (g) communicating each digital series of non-disregarded memory words from said memory to the central processing means.

2. The method as recited in claim 1 in which said interface module connecting step further comprises the step of:

connecting a parallel-to-serial converter to said interface module memory, thereby enabling parallel data generated by said peripheral devices to be received by said memory receiving means as serial data.

3. The method as recited in claim 2 which said step of providing memory receiving means comprises the step of providing a first-in/first-out memory.

4. The method as recited in claim 2, said method further comprising the step of:

(h) connecting a bi-directional balanced line between said converter and the central processing means.

5. The method as recited in claim 4 in which said converter interposing step further comprises the step of:

providing, in the converter, individual line addresses such that said bi-directional balanced line may be connected to a plurality of peripheral device interfaces to thereby permit the central processing means to individually connect and communicate with each interface using the assigned individual addresses for each interface.

6. The method as recited in claims 1, 2 or 5 in which said step (a) of connecting a module and obtaining information therefrom, further comprises the step of:

generating a strobe pulse corresponding to each N-bit word.

7. The method as recited in claim 6 in which said step (b) of storing each series of N-bit words comprises the step of:

(i) sequentially applying said N-bit words to bi-stable elements; and (ii) latching said bi-stable elements with the output of a time-delay mono-stable element, said mono-stable element being trigger-responsive to said strobe pulses, said time delay exceeding the interval necessary for applying each N-bit word to said bi-stable elements, thereby assuring that the bi-stable elements will not change states before a given N-bit word has been fully applied thereto but, however, permitting the bi-stable elements to change states after the N-word has been applied.

8. The method as recited in claim 7, further comprising the step of:

providing a first-in/first-out memory connected to the output of said bi-stable element prior to said masking step (c).

9. The method as recited in claim 8 in which said masking step (c) further comprises the step of:

providing logic means to define those words to be disregarded and therefore to be masked.

10. The method as recited in claim 9 in which said logic means providing step includes the step of:

providing means for pre-programming said masking logic.

11. The method as recited in claim 7 in which said step (d) of receiving non-disregarded memrory includes the step of:

providing a strobe-responsive mono-stable element which, when actuated by said strobe pulses, permits said memory to store said non-disregarded words.

12. The method as recited in claim 11 in which said step (e) of providing memory transfer means includes providing a strobe-responsive, mono-stable element having an output pulse width exceeding the interval between successive word-associated strobe pulses, thereby providing a mono-stable output in the form of a single pulse having a greater duration than said word-associated strobe pulse or the intervals therebetween, whereby the word-associated strobe pulses emanating from the peripheral devices are thereby blocked from entry into memory when the memory has words in storage and when the strobe pulse is not itself a word to be stored.

* * * * *